(12) United States Patent
He et al.

(10) Patent No.: US 11,288,801 B2
(45) Date of Patent: Mar. 29, 2022

(54) EYE CARE DEVICE AND METHOD FOR ASSESSING AND PREDICTING DEMENTIA

(71) Applicants: NATIONAL CHIN-YI UNIVERSITY OF TECHNOLOGY, Taichung (TW); Chi Mei Medical Center, Tainan (TW)

(72) Inventors: Yue-Jing He, Taichung (TW); Ching-Ping Chang, Tainan (TW); Shu-Chun Kuo, Tainan (TW); Kao-Chang Lin, Tainan (TW)

(73) Assignees: NATIONAL CHIN-YI UNIVERSITY OF TECHNOLOGY, Taichung (TW); CHI MEI MEDICAL CENTER, Tainan (TW)

( * ) Notice: Subject to any disclaimer, the term of this patent is extended or adjusted under 35 U.S.C. 154(b) by 0 days.

(21) Appl. No.: 17/033,962

(22) Filed: Sep. 28, 2020

(65) Prior Publication Data

US 2022/0036552 A1 Feb. 3, 2022

(30) Foreign Application Priority Data

Jul. 28, 2020 (TW) .................................. 109125465

(51) Int. Cl.
*G06K 9/00* (2006.01)
*G06T 7/00* (2017.01)
*G06T 7/10* (2017.01)

(52) U.S. Cl.
CPC .............. *G06T 7/0014* (2013.01); *G06T 7/10* (2017.01); *G06T 2207/10088* (2013.01);
(Continued)

(58) Field of Classification Search
CPC ..................... G06T 7/0014; G06T 7/10; G06T 2207/10088; G06T 2207/10101;
(Continued)

(56) References Cited

U.S. PATENT DOCUMENTS

2021/0030350 A1* 2/2021 Apte .................. G01N 33/6896
2021/0158525 A1* 5/2021 Iwase ........................ G06T 7/97

FOREIGN PATENT DOCUMENTS

CN 110010219 A 7/2019
WO WO-2020252256 A1 * 12/2020 ........... G06N 3/0454

OTHER PUBLICATIONS

Zhe Jiang et al., "Comparative study of deep learning models for optical coherence tomography angiography", Biomedical Optics Express, published on Mar. 1, 2020, vol. 11, Issue 3, pp. 1580-1597, published by The Optical Society, United States.
(Continued)

*Primary Examiner* — Atiba O Fitzpatrick
(74) *Attorney, Agent, or Firm* — CKC & Partners Co., LLC

(57) ABSTRACT

An establishing method of a retinal layer thickness detection model includes following steps. A reference database is obtained, and an image pre-processing step, a feature selecting step, a training step and a confirming step are performed. The reference database includes reference optical coherence tomographic images. In the image pre-processing step, the reference optical coherence tomographic images are duplicated and cell segmentation lines of retinal layers are marked to obtain control optical coherence tomographic images. In the feature selecting step, the reference optical coherence tomographic images are analyzed to obtain reference image features. The training step is to train with the reference image features and obtain the retinal layer thickness detection model. In the confirming step, marked optical coherence tomographic images are output by the retinal layer thickness detection model, and compared with the control optical coherence tomographic images to confirm an accuracy of the retinal layer thickness detection model.

6 Claims, 17 Drawing Sheets
(4 of 17 Drawing Sheet(s) Filed in Color)

(52) U.S. Cl.
CPC .............. *G06T 2207/10101* (2013.01); *G06T 2207/20081* (2013.01); *G06T 2207/20084* (2013.01); *G06T 2207/30041* (2013.01)

(58) Field of Classification Search
CPC . G06T 2207/20081; G06T 2207/20084; G06T 2207/30041
See application file for complete search history.

(56) References Cited

OTHER PUBLICATIONS

Baidaa Al-Bander, "Retinal Image Analysis Based on Deep Learning", Jun. 2018, pp. i-xv, 1-195, University of Liverpool, United Kingdom.

Alexander Y. Lau et al., "Retinal image analytics detects white matter hyperintensities in healthy adults", Annals of Clinical and Translational Neurology, published on Nov. 15, 2018, vol. 6, Issue 1, pp. 98-105, published by Wiley Periodicals, Inc. on behalf of American Neurological Association, United States.

* cited by examiner

EYE CARE DEVICE AND METHOD FOR ASSESSING AND PREDICTING DEMENTIA

RELATED APPLICATIONS

This application claims priority to Taiwan Application Serial Number 109125465, filed Jul. 28, 2020, which is herein incorporated by reference.

BACKGROUND

Technical Field

The present disclosure relates to a medical information analysis model, system and method. More particularly, the present disclosure relates to a retinal layer thickness detection model, a retinal layer thickness detection system, an eye care device, a method for detecting retinal layer thickness and a method for assessing and predicting dementia.

Description of Related Art

The retina is a very thin layer of cells at the back of an eyeball of vertebrates and some cephalopods. The retina includes rod cells and cone cells which can sense light, and the sensed light can be converted into neural signals. The converted neural signals can be processed by other nerve cells on the retina and converted into action potentials of retinal ganglion cells. In the process of morphogenesis, the retina and the optic nerve extend from the brain. The retina and the central nervous system have the same origin and both originate from the developing neural ectoderm, and maintain a direct and permanent connection through the optic nerve. As an extension of the central nervous system, the retina and the brain share many histological, physiological and embryological features.

The human retina is divided into 10 layers. The 10 layers are, from the outermost to the innermost, retinal pigment epithelial cells, layer of rods and cones, external limiting membrane, outer nuclear layer, outer plexiform layer, inner nuclear layer, inner plexiform layer, ganglion cell layer, nerve fiber layer and inner limiting membrane. Many ophthalmic diseases are accompanied by pathological changes in retinal thickness due to edema or atrophy of the retina. Diseases such as diabetic retinopathy, central serous chorioretinopathy, retinal vascular occlusion, uveitis and cataract extraction may cause macular edema which leads to an increase in retinal thickness. In contrast, retinal atrophy caused by glaucoma and some degenerative diseases may lead to a decrease in retinal thickness. Objective, accurate, and sensitive measurement of retinal thickness has important clinical significance for diagnosis and treatment guidance of these ophthalmic diseases. In addition, the segmentation of the retinal layers helps to measure the maximum thickness and the cell density of a single retinal layer for the most detailed observation, to avoid human diagnostic error due to insufficient clinical experience, and the existence of the abovementioned diseases may be detected.

At present, the relevant information of quantitative data can be obtained mainly by manual segmentation. Manual segmentation not only requires professional judges, it is also pretty time-consuming for clinical use or large-scale multi-center trials. Furthermore, because the judgement is subjective, it is easy to make misjudgment of the result and lose the great opportunity for treatment. In this regard, automatic segmentation and quantification system is a very important issue. Evaluation can be made based on the establishment of a big database after segmentation as well as prognosis and treatment response of the patient, which will be worthy of clinical applications.

SUMMARY

According to an aspect of the present disclosure, an establishing method of a retinal layer thickness detection model includes steps as follows. A reference database is obtained, an image pre-processing step is performed, a feature selecting step is performed, a training step is performed and a confirming step is performed. The reference database includes a plurality of reference optical coherence tomographic images. In the image pre-processing step, each of the plurality of reference optical coherence tomographic images is duplicated and a cell segmentation line of each of retinal layers is marked, so as to obtain a plurality of control optical coherence tomographic images. In the feature selecting step, each of the plurality of reference optical coherence tomographic images is analyzed by a feature selecting module, and at least one reference image feature is obtained from each of the plurality of reference optical coherence tomographic images, so as to obtain a plurality of the reference image features. The training step is to train with the plurality of the reference image features through a convolution neural network learning classifier to reach convergence, so as to obtain the retinal layer thickness detection model. In the confirming step, a plurality of marked optical coherence tomographic images are output by the retinal layer thickness detection model, and each of the plurality of marked optical coherence tomographic images is compared with corresponding one of the plurality of control optical coherence tomographic images, so as to confirm an accuracy of the retinal layer thickness detection model.

According to another aspect of the present disclosure, a retinal layer thickness detection system includes an image capturing unit and a processor. The image capturing unit is configured to capture a target optical coherence tomographic image of a subject. The processor is electrically connected to the image capturing unit and stores a program, wherein the program detects a retinal layer thickness of the subject when the program is executed by the processor. The program includes a reference database obtaining module, a reference image pre-processing module, a reference feature selecting module, a training module, a confirming module, a target feature selecting module, a marking module and a calculating module. The reference database obtaining module is configured to obtain a reference database, wherein the reference database includes a plurality of reference optical coherence tomographic images. The reference image pre-processing module is configured to duplicate each of the plurality of reference optical coherence tomographic images and mark a cell segmentation line of each of retinal layers, so as to obtain a plurality of control optical coherence tomographic images. The reference feature selecting module is configured to analyze each of the plurality of reference optical coherence tomographic images, and obtain at least one reference image feature from each of the plurality of reference optical coherence tomographic images, so as to obtain a plurality of the reference image features. The training module is configured to train with the plurality of the reference image features through a convolution neural network learning classifier to reach convergence, so as to obtain a retinal layer thickness detection model. The confirming module is configured to output a plurality of marked optical coherence tomographic images by the retinal layer thickness detection model, and to compare each of the plurality of marked optical coherence tomographic images with corresponding one of the plurality of control optical coherence tomographic images, so as to confirm an accuracy of the retinal layer thickness detection model. The target feature selecting module is configured to analyze the target optical coherence tomographic images, and obtain at least one target image feature. The marking module is configured to analyze the target image feature by the retinal layer thickness detection model, so as to output a marked target optical coherence tomographic image. The calculating module is configured to calculate a cell thickness of each of the retinal layers in the marked target optical coherence tomographic image.

According to one another aspect of the present disclosure, an eye care device includes the aforementioned retinal layer thickness detection system and an electronic device. The electronic device is connected to the retinal layer thickness detection system through telecommunication.

According to still another aspect of the present disclosure, a method for detecting retinal layer thickness includes steps as follows. The aforementioned retinal layer thickness detection model is provided, a target optical coherence tomographic image of a subject is provided, the target optical coherence tomographic image is analyze, and a cell thickness of each of retinal layers is calculated. The target optical coherence tomographic image is analyzed by the retinal layer thickness detection model, so as to output a marked target optical coherence tomographic image. The cell thickness of each of retinal layers in the marked target optical coherence tomographic image is calculated by a calculating module.

According to further another aspect of the present disclosure, a method for assessing and predicting dementia includes steps as follows. The aforementioned retinal layer thickness detection model is provided, a target optical coherence tomographic image of a subject is provided, the target optical coherence tomographic image is analyzed, a cell thickness of each of retinal layers is calculated, a clinical test data of the subject is provided, and the cell thickness of each of the retinal layers is compared. The target optical coherence tomographic image is analyzed by the retinal layer thickness detection model, so as to output a marked target optical coherence tomographic image. The cell thickness of each of retinal layers in the marked target optical coherence tomographic image is calculated by a calculating module. The cell thickness of each of the retinal layers is compared with the clinical test data by a regression analysis model, so as to calculate an assessing grade representing a possibility of the subject having dementia.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

Figure 1:
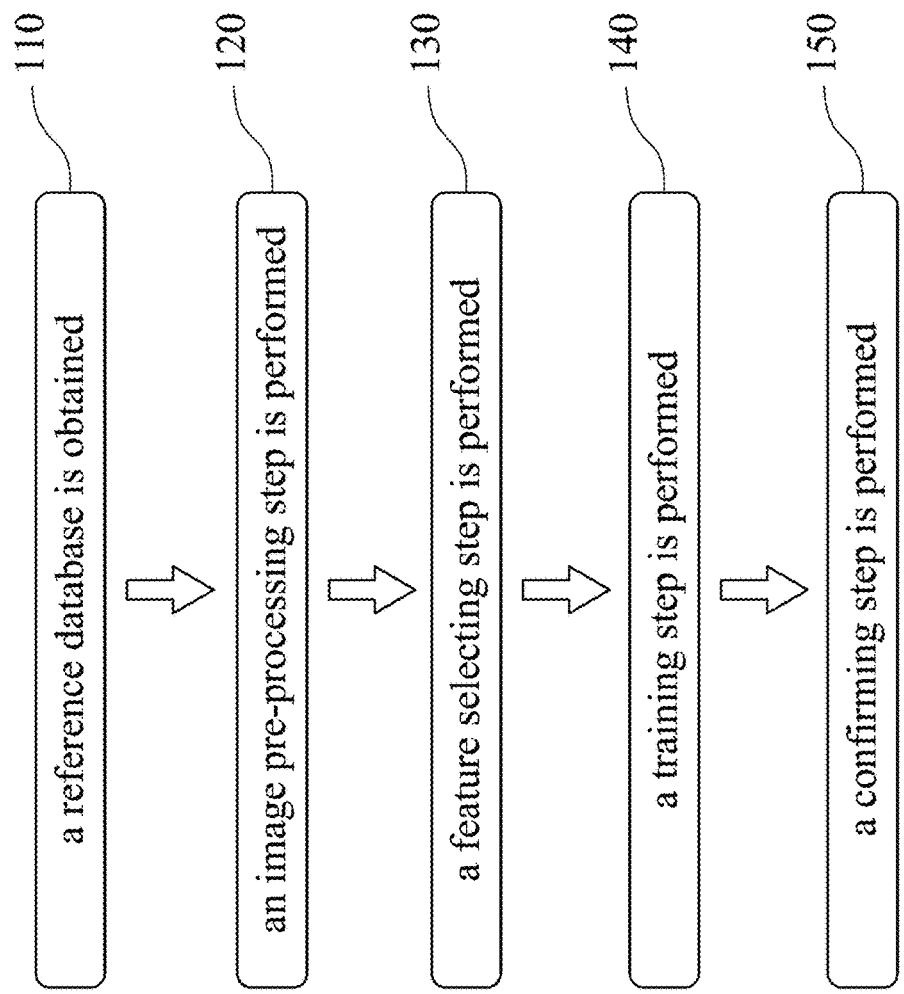
FIG. 1 is a step flow chart of an establishing method of a retinal layer thickness detection model according to an embodiment of the present disclosure.

Please refer to FIG. 1. FIG. 1 is a step flow chart of an establishing method of a retinal layer thickness detection model 100 according to an embodiment of the present disclosure. The establishing method of the retinal layer thickness detection model 100 includes Step 110, Step 120, Step 130, Step 140 and Step 150. The established retinal layer thickness detection model can be configured to output marked optical coherence tomographic images, so as to further calculate a cell thickness of each of retinal layers.

In Step 110, a reference database is obtained. The reference database includes a plurality of reference optical coherence tomographic (OCT) images.

In Step 120, an image pre-processing step is performed. The image pre-processing step is to duplicate each of the reference optical coherence tomographic images and mark a cell segmentation line of each of the retinal layers, so as to obtain a plurality of control optical coherence tomographic images.

In Step 130, a feature selecting step is performed. The feature selecting step is to analyze each of the reference optical coherence tomographic images by a feature selecting module, and obtain at least one reference image feature from each of the reference optical coherence tomographic images, so as to obtain a plurality of the reference image features.

In Step 140, a training step is performed. The training step is to train with the plurality of the reference image features through a convolution neural network learning classifier to reach convergence, so as to obtain the retinal layer thickness detection model. The convolution neural network learning classifier can include a downsampling tower and an upsampling tower, and the downsampling tower and the upsampling tower are connected to each other by a skip connection. Preferably, the downsampling tower includes a plurality of DenseNet blocks (DNBs), and an image size is progressively reduced between each of the DenseNet blocks by a convolution (Cony) method. The upsampling tower includes a plurality of DenseNet blocks (DNBs), and an image size is progressively enlarged between each of the DenseNet blocks by a transpose convolution (TConv) method.

In Step 150, a confirming step is performed. The confirming step is to output a plurality of marked optical coherence tomographic images by the retinal layer thickness detection model, and to compare each of the marked optical coherence tomographic images with corresponding one of the control optical coherence tomographic images, so as to confirm an accuracy of the retinal layer thickness detection model.

Figure 2:
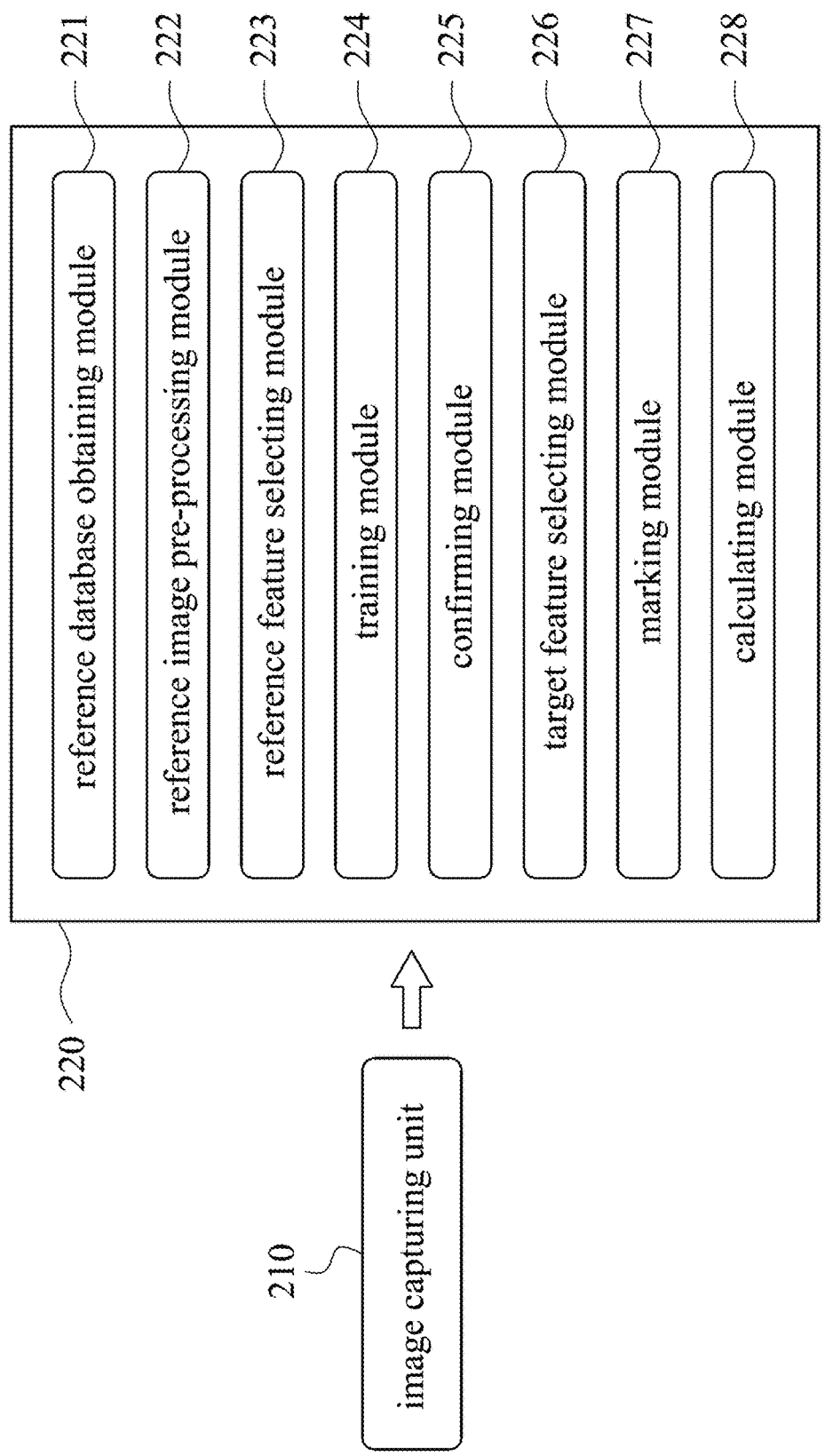
FIG. 2 is a structural schematic view of a retinal layer thickness detection system according to another embodiment of the present disclosure.

Please refer to FIG. 2. FIG. 2 is a structural schematic view of a retinal layer thickness detection system 200 according to another embodiment of the present disclosure. The retinal layer thickness detection system 200 includes an image capturing unit 210 and a processor 220.

The image capturing unit 210 can be a retinal optical tomographic scanner, which is configured to capture a target optical coherence tomographic image of a subject.

The processor 220 is electrically connected to the image capturing unit 210 and stores a program, wherein the program detects a retinal layer thickness of the subject when the program is executed by the processor 220. The program includes a reference database obtaining module 221, a reference image pre-processing module 222, a reference feature selecting module 223, a training module 224, a confirming module 225, a target feature selecting module 226, a marking module 227 and a calculating module 228.

The reference database obtaining module 221 is configured to obtain a reference database. The reference database includes a plurality of reference optical coherence tomographic images.

The reference image pre-processing module 222 is configured to duplicate each of the reference optical coherence tomographic images and mark a cell segmentation line of each of retinal layers, so as to obtain a plurality of control optical coherence tomographic images.

The reference feature selecting module 223 is configured to analyze each of the reference optical coherence tomographic images, and obtain at least one reference image feature from each of the reference optical coherence tomographic images, so as to obtain a plurality of the reference image features.

The training module 224 is configured to train with the plurality of the reference image features through a convolution neural network learning classifier to reach convergence, so as to obtain a retinal layer thickness detection model.

The confirming module 225 is configured to output a plurality of marked optical coherence tomographic images by the retinal layer thickness detection model, and to compare each of the marked optical coherence tomographic images with corresponding one of the control optical coherence tomographic images, so as to confirm an accuracy of the retinal layer thickness detection model.

The target feature selecting module 226 is configured to analyze the target optical coherence tomographic images, and obtain at least one target image feature.

The marking module 227 is configured to analyze the target image feature by the retinal layer thickness detection model, so as to output a marked target optical coherence tomographic image.

The calculating module 228 is configured to calculate a cell thickness of each of the retinal layers in the marked target optical coherence tomographic image.

Figure 3:
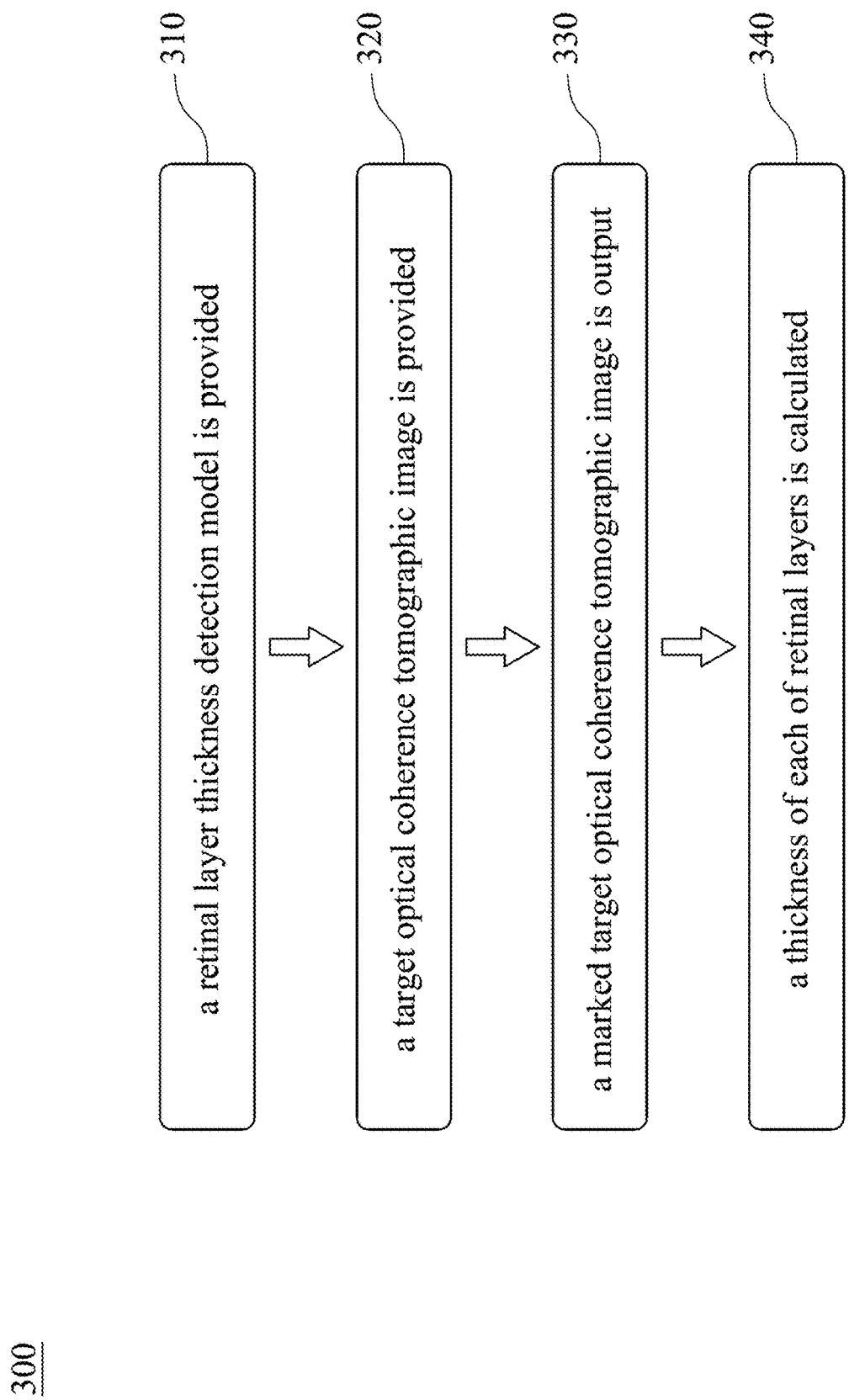
FIG. 3 is a step flow chart of a method for detecting retinal layer thickness according to one another embodiment of the present disclosure.

Please refer to FIG. 3. FIG. 3 is a step flow chart of a method for detecting retinal layer thickness 300 according to one another embodiment of the present disclosure. The method for detecting retinal layer thickness 300 includes Step 310, Step 320, Step 330 and Step 340.

In Step 310, the retinal layer thickness detection model is provided. The retinal layer thickness detection model is established through aforementioned Step 110 to Step 150.

In Step 320, a target optical coherence tomographic image of a subject is provided.

In Step 330, the target optical coherence tomographic image is analyzed by the retinal layer thickness detection model, so as to output a marked target optical coherence tomographic image.

In Step 340, a cell thickness of each of retinal layers in the marked target optical coherence tomographic image is calculated by the calculating module 228, so as to obtain a retinal layer thickness of the subject.

Figure 4:
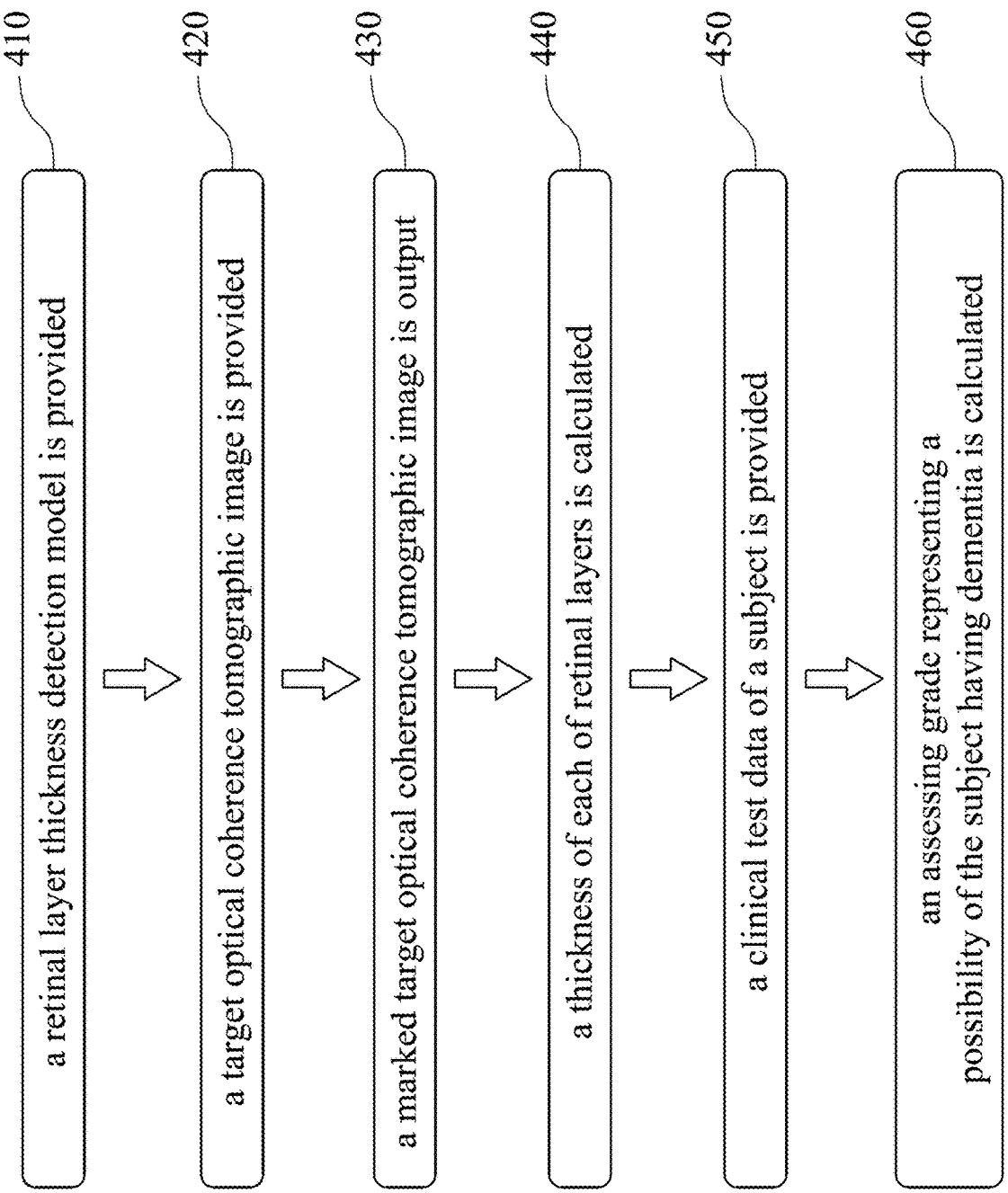
FIG. 4 is a step flow chart of a method for assessing and predicting dementia according to still another embodiment of the present disclosure.

Please refer to FIG. 4. FIG. 4 is a step flow chart of a method for assessing and predicting dementia 400 according to still another embodiment of the present disclosure. The method for assessing and predicting dementia 400 includes Step 410, Step 420, Step 430, Step 440, Step 450 and Step 460.

In Step 410, the retinal layer thickness detection model is provided. The retinal layer thickness detection model is established through aforementioned Step 110 to Step 150.

In Step 420, a target optical coherence tomographic image of a subject is provided.

In Step 430, the target optical coherence tomographic image is analyzed by the retinal layer thickness detection model, so as to output a marked target optical coherence tomographic image.

In Step 440, a cell thickness of each of retinal layers in the marked target optical coherence tomographic image is calculated by the calculating module 228, so as to obtain a retinal layer thickness of the subject.

In Step 450, a clinical test data of the subject is provided. The clinical test data can include a computed tomographic image, a nuclear magnetic resonance image and a blood test value.

In Step 460, the cell thickness of each of the retinal layers is compared with the clinical test data by a regression analysis model, so as to calculate an assessing grade representing a possibility of the subject having dementia.

Figure 5:
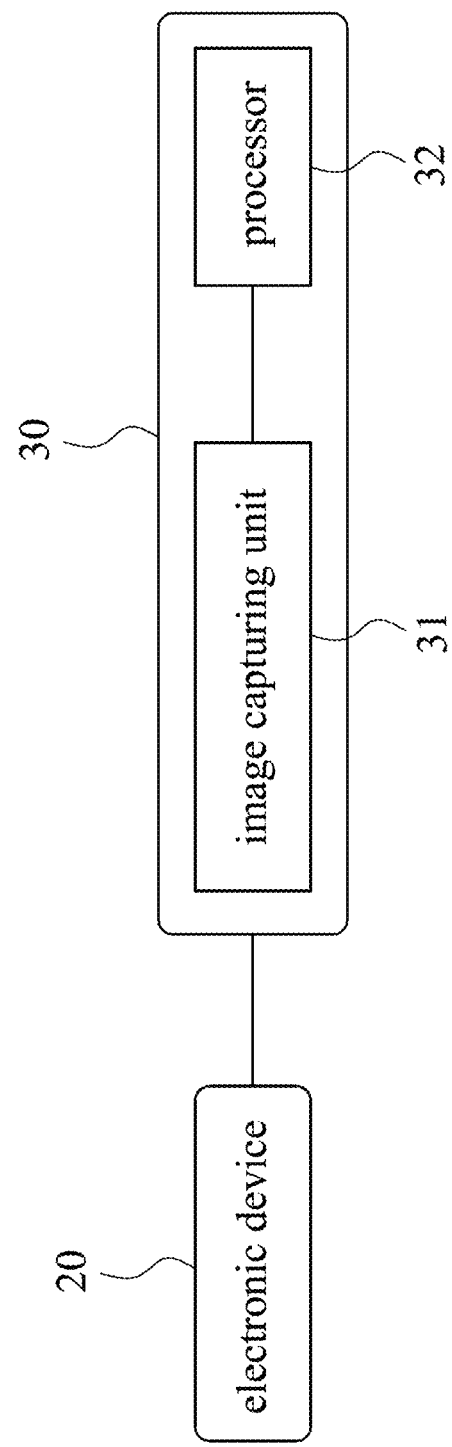
FIG. 5 is a structural schematic view of an eye care device according to further another embodiment of the present disclosure.

Please refer to FIG. 5. FIG. 5 is a structural schematic view of an eye care device 10 according to further another embodiment of the present disclosure. As shown in FIG. 5, the eye care device 10 includes a retinal layer thickness detection system 30 and an electronic device 20. The electronic device 20 is connected to the retinal layer thickness detection system 30 through telecommunication. In detail, the retinal layer thickness detection system 30 includes an image capturing unit 31 and a processor 32, and is similar to the structure of the retinal layer thickness detection system 200 in FIG. 2. The electronic device 20 can further show a cell thickness of each of retinal layers output by the processor 32 of the retinal layer thickness detection system 30, or further go with an assessing grade representing a possibility of a subject having dementia output by a regression analysis model (not shown). Also, the electronic device 20 can further show an assessing result of the subject having ophthalmic diseases or dementia and follow-up recommended medical plans such as medication or referral in real time.

Furthermore, though it is not shown in the figures, the image capturing unit 31 in the eye care device 10 of the present disclosure can be a retinal optical tomographic scanner, so as to capture a target optical coherence tomographic image of the subject. The electronic device 20 can be a portable electronic device such as a mobile phone or a tablet. The processor 32 can further be integrated into the electronic device, which makes the processor 32 not only easy to carry, but also beneficial to the sensitivity and convenience of subsequent large-scale eye and brain function screening, which the present disclosure is not limited thereto.

Example

I. Reference Database

The reference database in the present disclosure includes three types of ophthalmic patients with early age-related macular degeneration (drusen), choroidal angiogenesis and diabetic macular edema. The optical coherence tomographic images and best corrected vision test data of the patients before and after receiving the anti-vascular endothelial growth factor (anti-VEGF) therapy, and tomographic images or magnetic resonance images of the patients seeing neurologist and the blood test value of every visit are collected. The criteria of enrollment are that the patients are adults (over 20 years old) and diagnosed by a doctor as early age-related macular degeneration (drusen), choroidal angiogenesis or diabetic macular edema. For each disease, 500 patients are recruited, and a total of 1500 patients are enrolled. Patients who have had corneal-related diseases, cataract without receiving a surgery and glaucoma must be excluded. If the reference optical coherence tomographic images are obtained from animals, Alzheimer's disease is first induced in the experimental animals. After the successful induction, the experimental animals are anesthetized and placed in front of the lens of the retinal optical tomographic scanner. The retinal optical tomographic scanner is connected to a computer and uses the auto-focus function in software to find the positions of the animals' retinas and shoot, and the photo is saved for subsequent analysis.

II. Pre-Process of Image

After obtaining the reference database, the image pre-processing step is performed. In the image pre-processing step, each of the reference optical coherence tomographic images is duplicated and a cell segmentation line of each of retinal layers is marked, so as to obtain a plurality of control optical coherence tomographic images. The unmarked reference optical coherence tomographic images and the marked control optical coherence tomographic images are defined as a sample group. In the experiment, there are 9000 sample groups which are further divided into 7500 training sample groups, 1000 confirming sample groups and 500 testing sample groups.

III. Convolution Neural Network Learning Classifier of Present Disclosure

Figure 6:
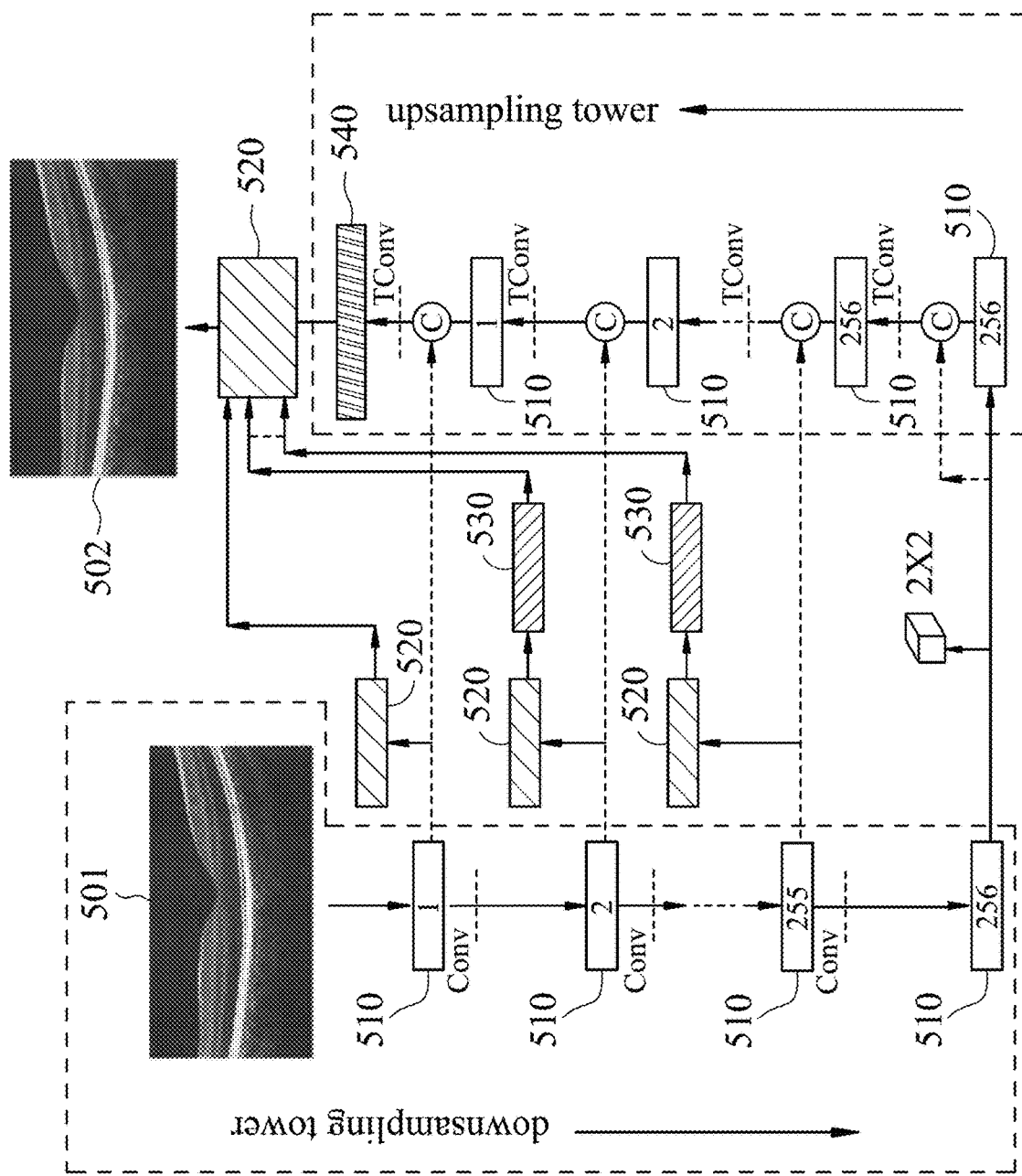
FIG. 6 is a structural schematic view of a convolution neural network learning classifier according to the present disclosure.

Please refer to FIG. 6. FIG. 6 is a structural schematic view of a convolution neural network learning classifier 500 according to the present disclosure. As shown in FIG. 6, the convolution neural network learning classifier 500 is mainly composed of a downsampling tower and an upsampling tower. The downsampling tower and the upsampling tower are connected to each other (shown by dotted arrows) by a skip connection. Each of the downsampling tower and the upsampling tower includes 256 DenseNet blocks 510. The downsampling tower is executed after the reference optical coherence tomographic image 501 is input. In the downsampling tower, an image size is reduced, image features are extracted and a neural vision is improved between each two of the DenseNet blocks 510 by a convolution (Cony) method. In the upsampling tower, the image size is progressively enlarged between each two of the DenseNet blocks 510 by a transpose convolution (TConv) method. Please note that, in the convolution neural network learning classifier 500 of the present disclosure, every DenseNet block 510 in the downsampling tower is output and connected to a concatenation layer 540 by a convolution layer 520 and a transpose convolution layer 530. Then, the result is output to the final convolution layer 520 for image reconstruction and a marked optical coherence tomographic image 502 is obtained. The obtained marked optical coherence tomographic image 502 can be compared with the control optical coherence tomographic images, so as to confirm an accuracy of the retinal layer thickness detection model.

Figure 7:
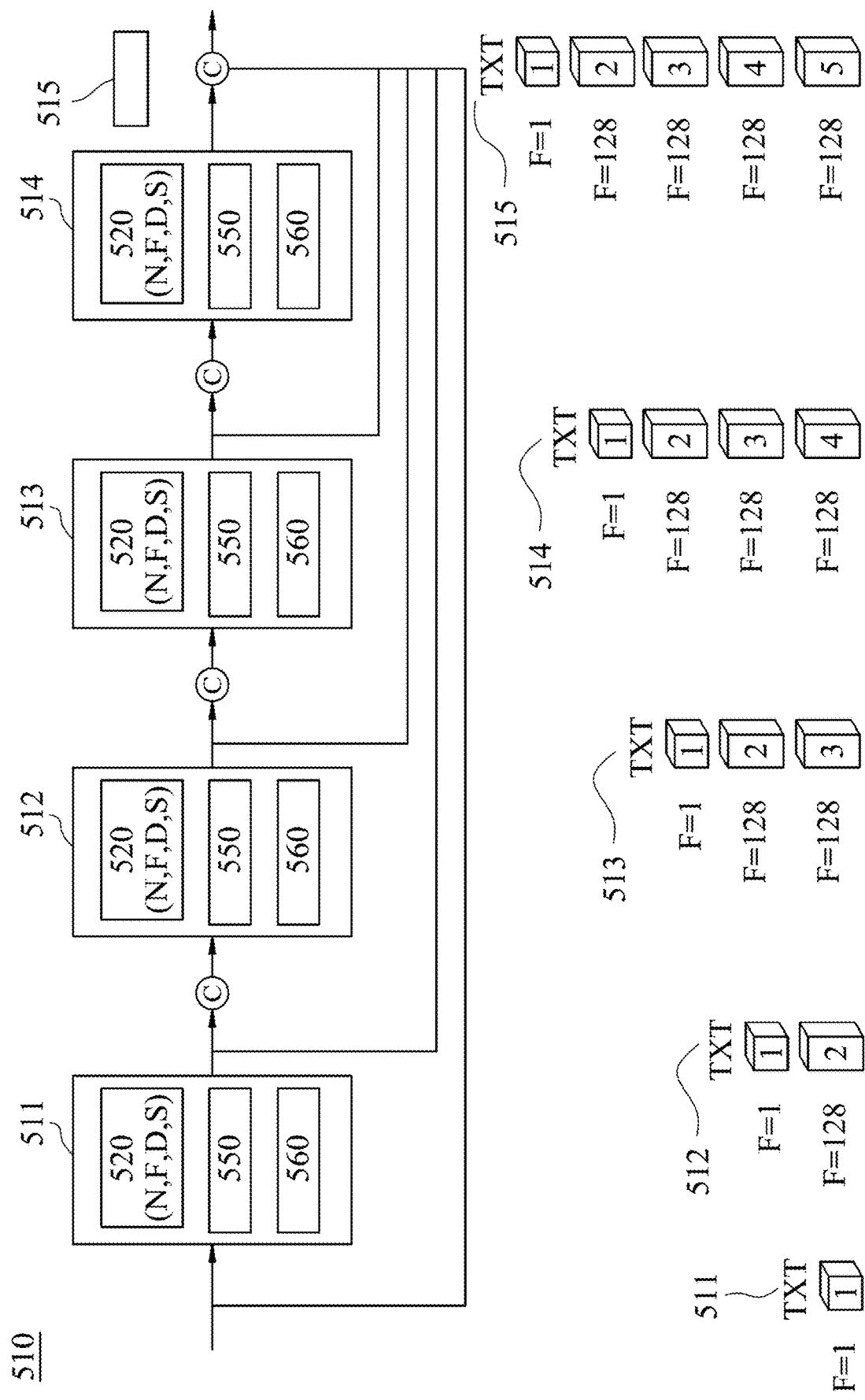
FIG. 7 is a structural schematic view of DenseNet blocks in FIG. 6.

Please refer to FIG. 7. FIG. 7 is a structural schematic view of the DenseNet blocks 510 in FIG. 6. The DenseNet block 510 includes 4 DNB modules, which are a first DNB module 511, a second DNB module 512, a third DNB module 513 and a fourth DNB module 514, respectively. The result is output to an output layer 515 after calculated by the 4 DNB modules. Each DNB module includes the convolution layer 520, a linear rectified unit training layer 550 and a batch normalization layer 560. The output result of each DNB module is transferred to the next layer for concatenation. The image size of the whole DenseNet block 510 is maintained by a padding method, that is, after calculated by every DNB module, the image remains the same size but only has the amount of channels changed. The amount of output channels of the DNB module is 3×128+ 1=385. In the figure, N represents filter sizes, F represents filter numbers, D represents dilation rates and S represents strides.

The convolution neural network learning classifier 500 of the present disclosure takes the linear rectified unit training layer 550 as the activation function. Compared with the traditional neural network activation function, the linear rectified unit training layer 550 has the advantages such as using bionic theory, having more effective gradient descent and backpropagation, preventing vanishing gradient and simplifying calculation process.

The loss function applied by the convolution neural network learning classifier 500 of the present disclosure is shown as Formula (1), which has the main purpose of providing the deep learning network to evaluate the degree of error between a training result and a target result.

$$L(w_{ji}^{(l)}) = \frac{1}{R}\sum_{r}^{R}(Y_r - \hat{Y}_r)^2 + \lambda \Omega_{Reg}(w_{ji}^{(l)}).$$ Formula (1)

Then, the loss function is calculated by a gradient descent method, so as to achieve the purpose of the self-adjusting and learning of the network. $w_{ji}^{(l)}$ is a network parameter, $Y_r$ is the training result, $\hat{Y}_r$ is the target result, $\Omega_{Reg}$ is a regularization term as shown in Formula (2), $\lambda$ is a regularization factor.

$$\Omega_{Reg}(w_{ji}^{(l)}) = \frac{1}{2}\sum_{l=1}^{L}\sum_{j=1}^{N}\sum_{i=1}^{M} w_{ji}^{(l)2}. \quad \text{Formula (2)}$$

A network parameter $w_{l+1}$ of the convolution neural network learning classifier 500 of the present disclosure is recursively updated by a mini batch gradient descent moment estimation technique, which is shown in Formula (3).

$$w_{l+1} = w_l - \frac{\eta m^l}{\sqrt{v_l} + \epsilon}. \quad \text{Formula (3)}$$

$\eta$ is a learning rate, and $\epsilon$ is a constant with a pretty small value which prevents the denominator of the second term in Formula (3) being zero. When updating the network parameter, the convolution neural network learning classifier 500 of the present disclosure considers mini batches with the amount of B. Therefore, there are averages of linear gradient descent method $\nabla L^r(w^l)$ and quadratic gradient descent method $[\nabla L^r(w^l)]^2$ in Formula (4) and Formula (5), and an average amount thereof is the amount of B of the mini batches. Furthermore, $\beta_1$ and $\beta_2$ are decay rates. The method of the convolution neural network learning classifier 500 randomly choosing the sample groups with the amount of B from the testing sample groups for deep learning every time is called mini batches.

$$m_l = \beta_1 m_{l+1} + (1-\beta_1)\frac{1}{B}\sum_{x_p \in B}^{B} \nabla L^r(w^l). \quad \text{Formula (4)}$$

$$v_l = \beta_2 v_{l-1} + (1-\beta_2)\frac{1}{B}\sum_{x_p \in B}^{B} [\nabla L^r(w^l)]^2. \quad \text{Formula (5)}$$

Formula (4) and Formula (5) describes that the convolution neural network learning classifier 500 not only applies the mini batch technique but also considers a previous gradient descent value of every mini batch in every adjustment. That is, when making the present adjustment of the network parameter, the previous adjusting experience will be considered as a basis for the present adjustment, which is an intelligent characteristic of dynamic adjustment of the network parameter generated from the previous experience in coordination with the present mini batches.

Figure 8:
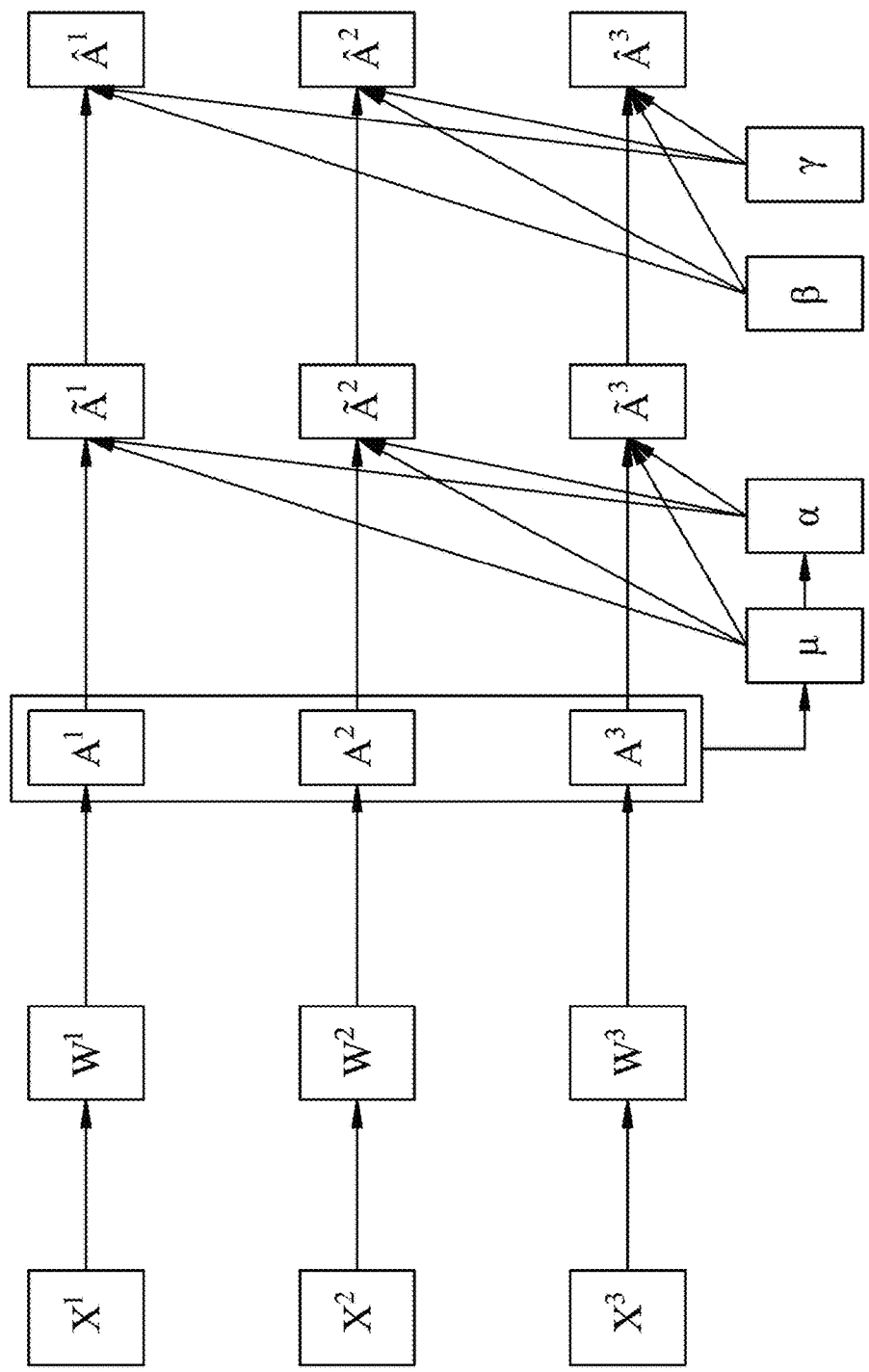
FIG. 8 is a structural schematic view of batch normalization layers in FIG. 7.

Please refer to FIG. 8. FIG. 8 is a structural schematic view of the batch normalization layers 560 in FIG. 7. The convolution neural network learning classifier 500 of the present disclosure reduces the time for training the retinal layer thickness detection model, prevents gradient descending and vanishing problems, and reduces the overfitting situation caused by parameter initialization through the batch normalization layers 560. In the learning process, the convolution neural network learning classifier 500 randomly chooses the sample groups (mini batch) with the amount of B from the testing sample groups for learning. In the process, an average p and a standard deviation a of the result $A^i$ output by every neuron are calculated, and $\tilde{A}^i$ is obtained through regularizing all the output values by the averages p and the standard deviations σ. However, we want the average p and the standard deviation σ of the mini batch entering the activation function are different from another mini batch, so β and γ are introduced for modification to obtain $\hat{A}^i$. Please refer to Formula (6) and Formula (7).

$$\hat{A}^l = \gamma \cdot \tilde{A}^l + \beta. \quad \text{Formula (6)}$$

$$\tilde{A}^i = \frac{A^i - \mu}{\sigma}. \quad \text{Formula (7)}$$

IV. Training Step

The 7500 training sample groups and the 1000 confirming sample groups are input into the convolution neural network learning classifier 500 for training. According to the training result, if a target of loss less than 2% cannot be satisfied, a deep-learning parameter adjusting process will be executed to retrain until the target is satisfied. Related parameters that can be further adjusted includes: initial parameter, learning rate, regularization factor, decay rate, amount of neuron of each layer, hierarchy number of neuron, size of mini batch, training sample groups and confirming sample groups. There is continuously monitoring and parameter-adjusting until the condition is improved.

After the training result satisfies the loss less than 2% without overfitting situation and reaches convergence to obtain the retinal layer thickness detection model, the retinal layer thickness detection model outputs a plurality of marked optical coherence tomographic images. Each of the marked optical coherence tomographic images is compared with corresponding one of the control optical coherence tomographic images, so as to confirm an accuracy of the retinal layer thickness detection model.

V. Cell Thickness Measurement of Each of Retinal Layers

Furthermore, a cell thickness of each of the retinal layers in the marked optical coherence tomographic image output by the retinal layer thickness detection model can be calculated by a calculating module. For example, the calculating module reads one of the marked optical coherence tomographic images marked by the retinal layer thickness detection model from a folder each time, and saves the calculation result of each cell thickness into an Excel file. Each cell thickness of all the marked optical coherence tomographic images in the folder is automatically calculated. Therefore, the problems of relying on human can be actually and effectively improved, and the overall detection efficiency and accuracy are enhanced.

Figure 9:
FIG. 9 is an optical coherence tomographic image of a rat.
Figure 10A:
FIG. 10A and FIG. 10B are schematic views of positions for measuring a cell thickness of each of retinal layers.
Figure 10B:

Please refer to FIG. 9, FIG. 10A and FIG. 10B. FIG. 9 is an optical coherence tomographic image of a rat. FIG. 10A is a schematic view of positions for measuring a cell thickness of each of retinal layers of a human eye. FIG. 10B is a schematic view of positions for measuring a cell thickness of each of retinal layers of the rat. When calculating the aforementioned cell thickness, the scale bar of the optical coherence tomographic image is shown in FIG. 9, and a relationship between a pixel and a length, that is, the length (μm/pixel) represented by a pixel unit, is converted. When calculating the cell thickness, the positions for measuring the cell thickness are shown in FIG. 10A and FIG. 10B, so as to finish calculating the cell thickness of all the positions.

VI. Relationship Between Cell Thickness of Each of Retinal Layers and Dementia

Because the retina and the central nervous system have the same origin, a deep-learning regression analysis model is further used in the present disclosure for training the machine finding the relationship among the optical coherence tomographic image, a clinical test data, such as a computed tomographic image, a nuclear magnetic resonance image and a blood test value, and dementia. The purpose of assessing and predicting dementia in advance based on the optical coherence tomographic image and the clinical test data, such as the computed tomographic image, the nuclear magnetic resonance image and the blood test value, is achieved.

Figure 11:
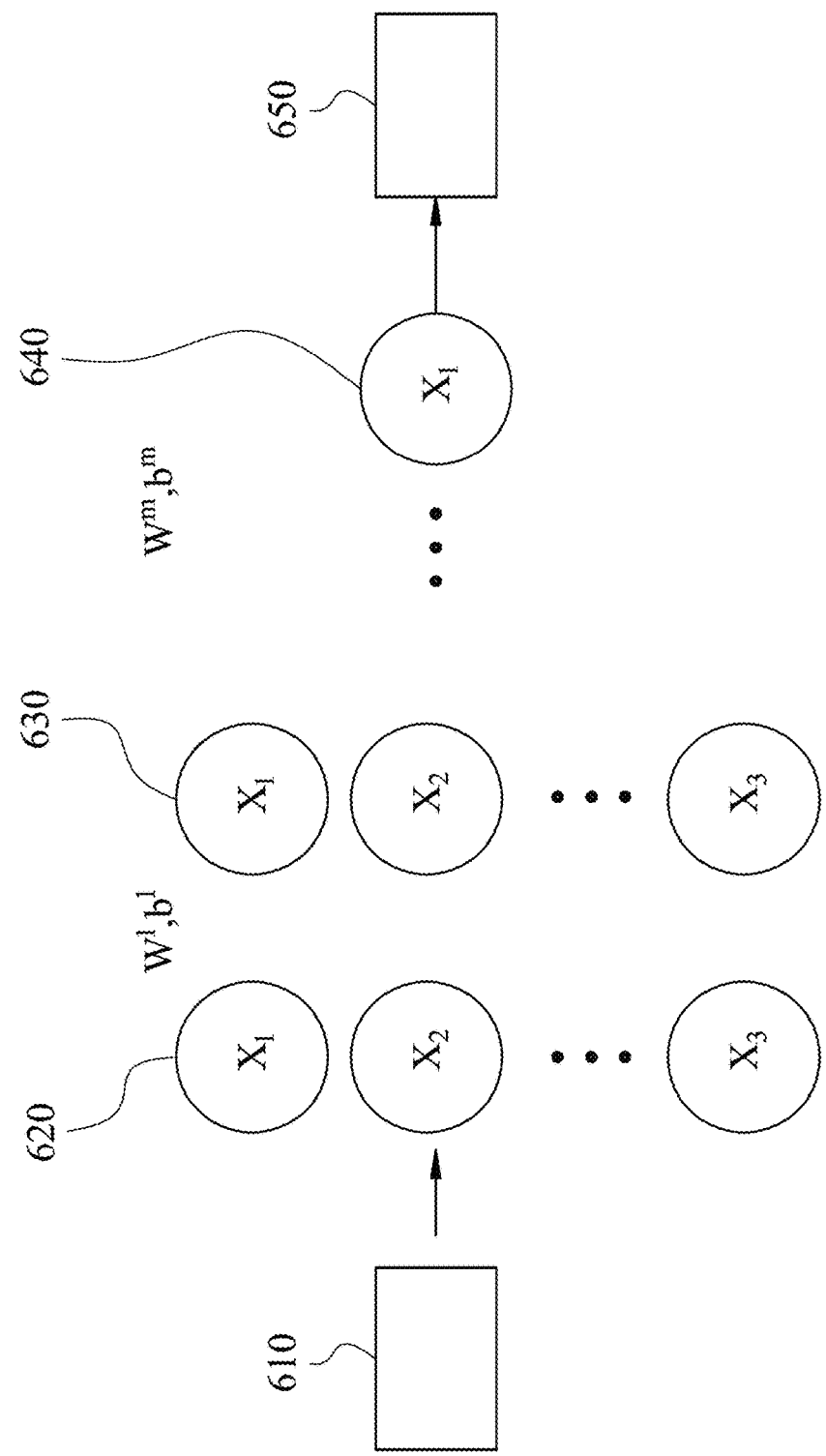
FIG. 11 is a structural schematic view of a regression analysis model.

Please refer to FIG. 11. FIG. 11 is a structural schematic view of the regression analysis model 600. The optical coherence tomographic image and the clinical test data, such as the computed tomographic image, the nuclear magnetic resonance image and the blood test value are taken as an input data 610. An output data 650 is obtained through calculation of an input layer 620, a first layer 630 and an output layer 640. The output data 650 is an assessing grade representing a possibility of a subject having dementia.

Figure 12:
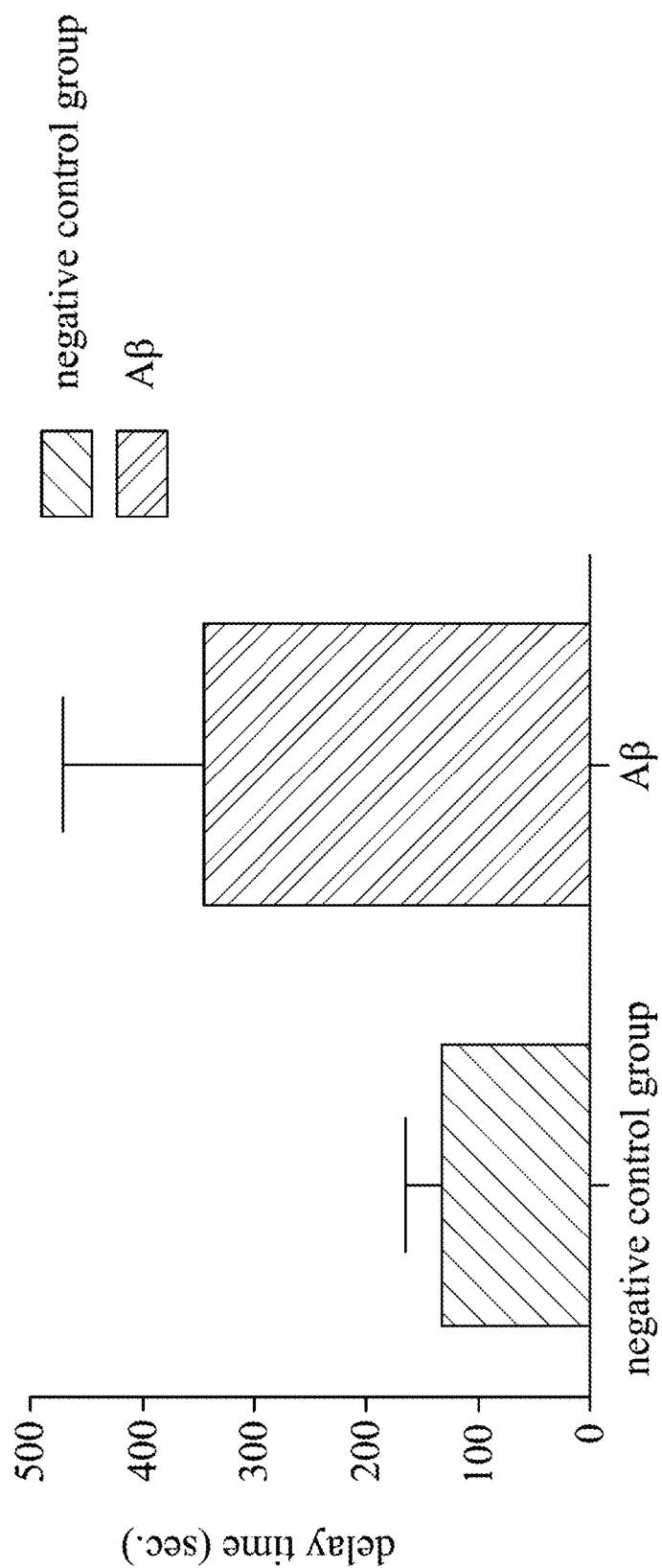
FIG. 12 is an analytic result graph of cognitive skill of experimental animals in an 8-arm maze test.
Figure 13:
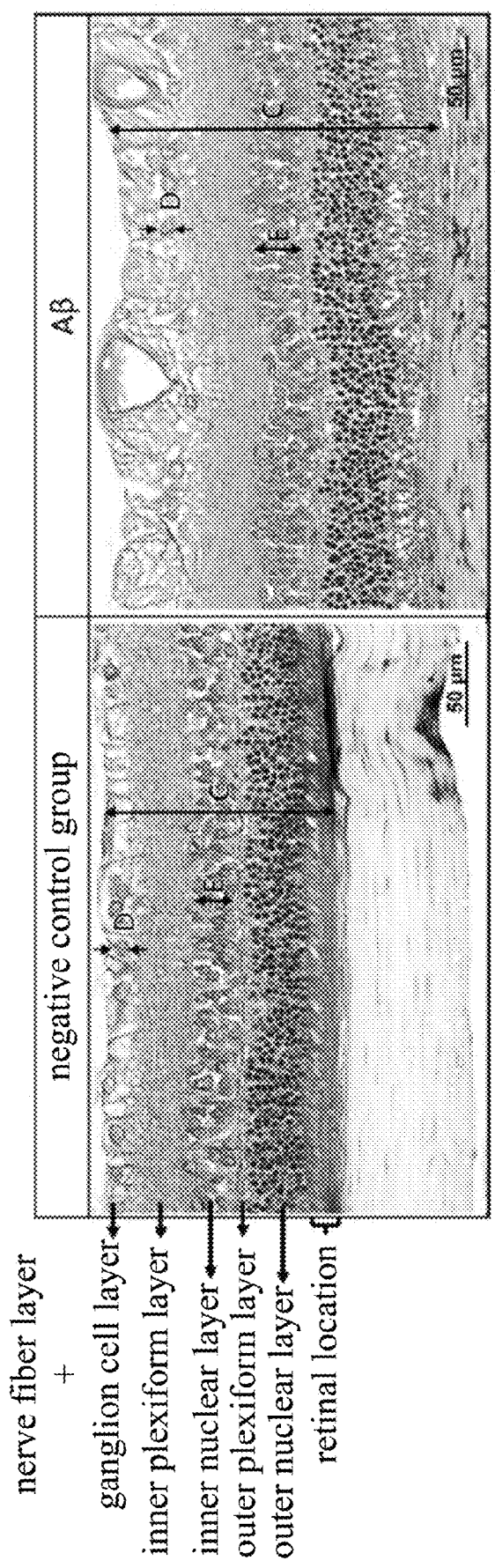
FIG. 13 is an analytic result graph of a cell thickness of each of retinal layers of the experimental animals.
Figure 14A:
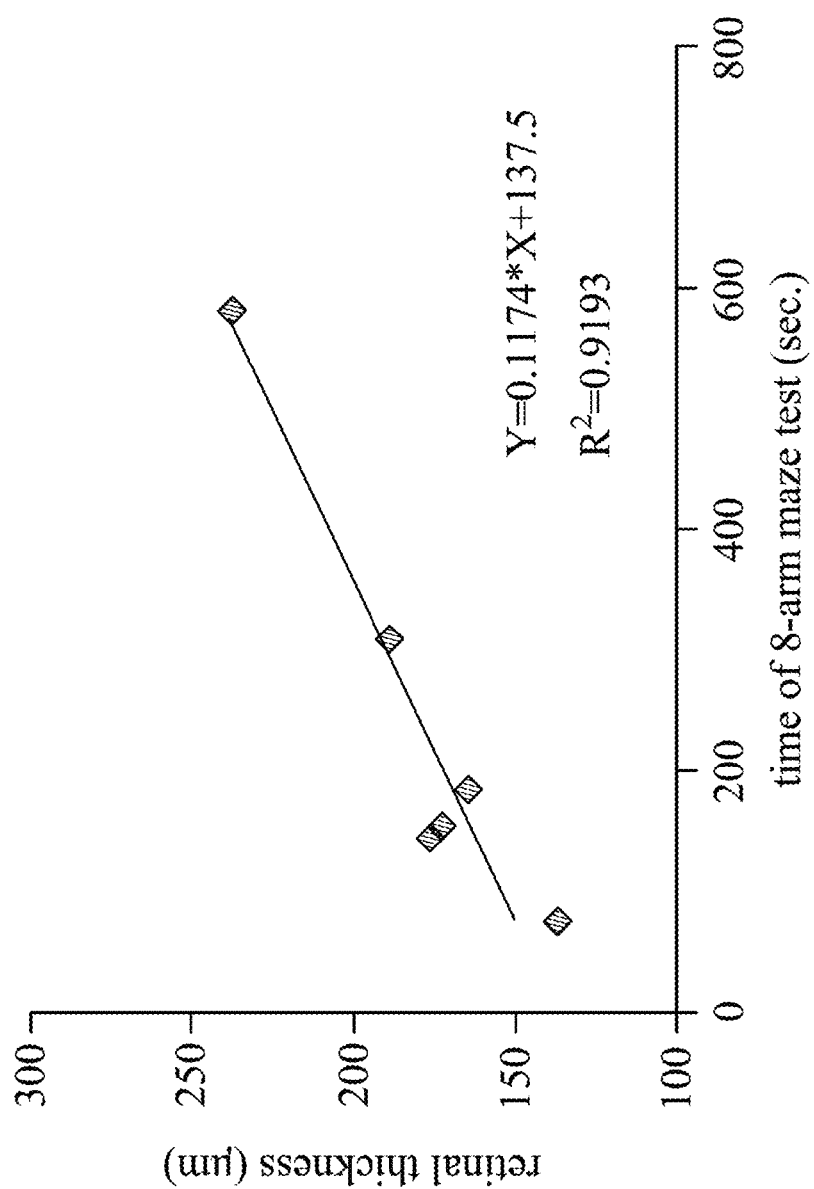
FIG. 14A, FIG. 14B and FIG. 14C are analytic result graphs of relationships between a time for the experimental animals finding food in the 8-arm maze test and the cell thickness of each of the retinal layers of the experimental animals.
Figure 14B:
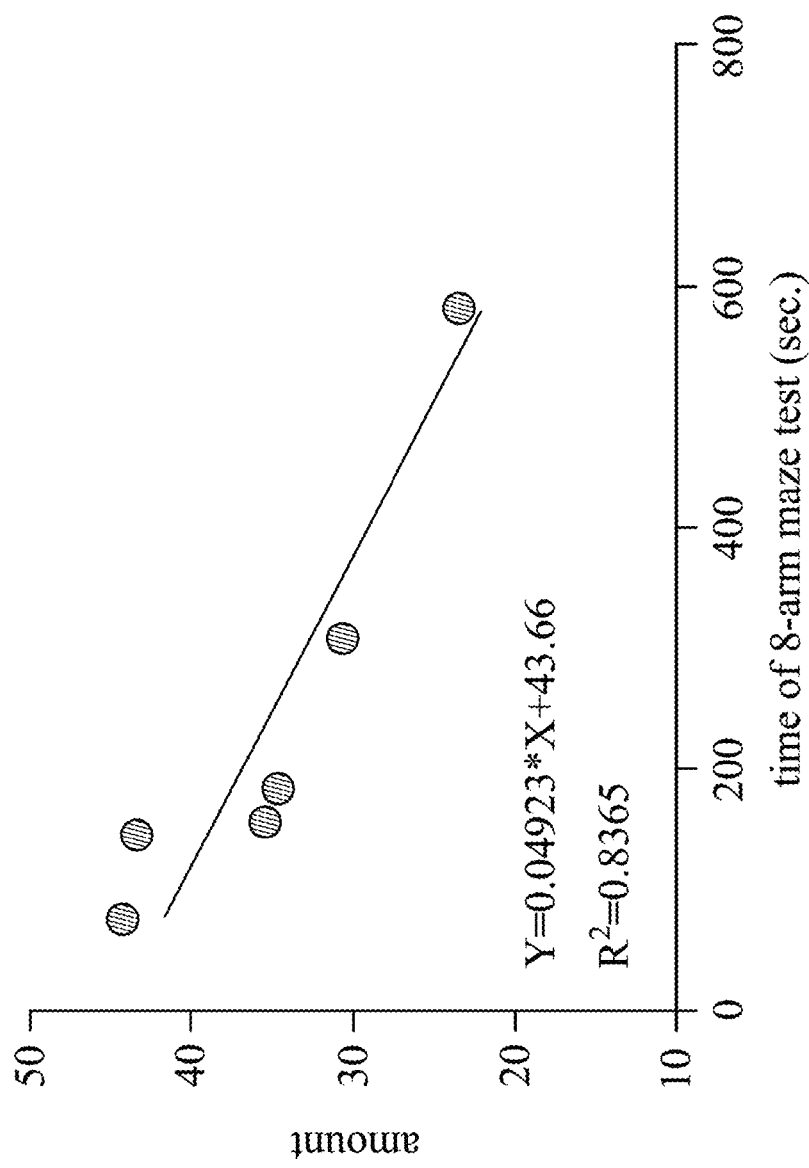
Figure 14C:
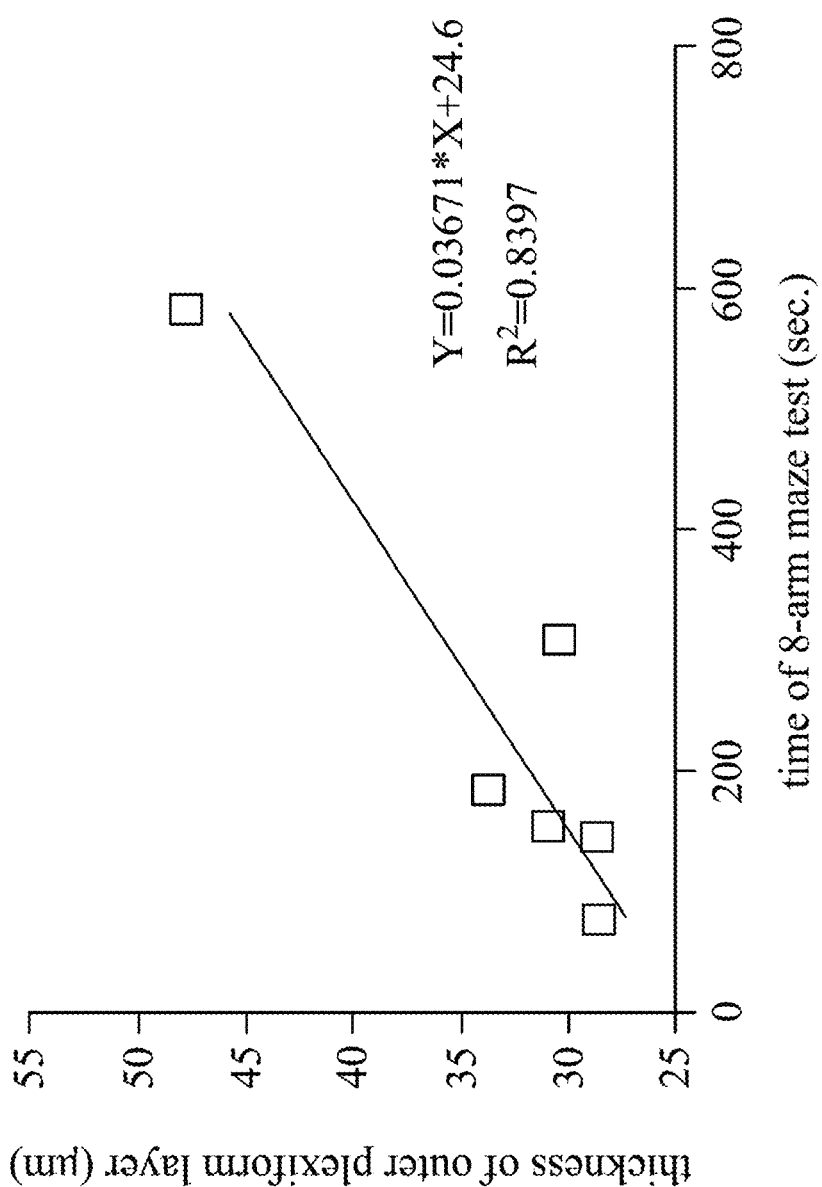

The animal test data also proves that there is a relationship between the cell thickness of each of the retinal layers and dementia. In the test, Alzheimer's disease is induced in the experimental animals. After the successful induction, optical coherence tomographic images of the rats with Alzheimer's disease are obtained, and cognitive skill of the rats with Alzheimer's disease are tested with an 8-arm maze. Please refer to FIG. 12, FIG. 13, FIG. 14A, FIG. 14B and FIG. 14C for the result. FIG. 12 is an analytic result graph of the cognitive skill of the experimental animals in the 8-arm maze test. FIG. 13 is an analytic result graph of a cell thickness of each of retinal layers of the experimental animals. FIG. 14A, FIG. 14B and FIG. 14C are analytic result graphs of relationships between a time for the experimental animals finding food in the 8-arm maze test and the cell thickness of each of the retinal layers of the experimental animals. In FIG. 14A to FIG. 14C, the relationships are analyzed by linear regression.

The result of FIG. 12 shows that, the time of the rats with Alzheimer's disease finding food is significantly longer than a negative control group, which represents the successful induction in the rats. FIG. 13 shows that, eyes of the negative control group and the rats with Alzheimer's disease are stained with hematoxylin and eosin to distinguish the cytoplasm and the cell nuclei, so as to analyze the cell thickness and a cell number of each of the retinal layers. It is obvious that the cell thicknesses of each of the retinal layers between the two groups of rats are different, and a thickness of retina of the rat with Alzheimer's disease is significantly larger. The results in FIG. 14A to FIG. 14C show that, when the time of finding food is longer, a corresponding total retinal thickness tends to be thicker (FIG. 14A), an amount of ganglion cells is smaller (FIG. 14B), and a thickness of outer plexiform layer is increased (FIG. 14C). The results are the same as FIG. 13, which means the cell thickness of each of the retinal layers is related to dementia, and can be analyzed by the regression analysis model 600. Therefore, the retinal layer thickness detection system of the present disclosure is configured to not only detect ophthalmic diseases, but also further assess and predict whether the subject having dementia or not.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for assessing and predicting dementia, comprising:
    obtaining a reference database, wherein the reference database comprises a plurality of reference optical coherence tomographic images;
    performing an image pre-processing step to duplicate each of the plurality of reference optical coherence tomographic images and mark a cell segmentation line of each of retinal layers, so as to obtain a plurality of control optical coherence tomographic images;
    performing a feature selecting step to analyze each of the plurality of reference optical coherence tomographic images by a feature selecting module, and obtain at least one reference image feature from each of the plurality of reference optical coherence tomographic images, so as to obtain a plurality of the reference image features;
    performing a training step to train with the plurality of the reference image features through a convolution neural network learning classifier to reach convergence, so as to obtain the retinal layer thickness detection model;
    performing a confirming step to output a plurality of marked optical coherence tomographic images by the retinal layer thickness detection model, and to compare each of the plurality of marked optical coherence tomographic images with corresponding one of the plurality of control optical coherence tomographic images, so as to confirm an accuracy of the retinal layer thickness detection model;
    providing a target optical coherence tomographic image of a subject;
    analyzing the target optical coherence tomographic image by the retinal layer thickness detection model, so as to output a marked target optical coherence tomographic image;
    calculating a cell thickness of each of retinal layers in the marked target optical coherence tomographic image by a calculating module;
    providing a clinical test data of the subject; and
    comparing the cell thickness of each of the retinal layers with the clinical test data by a regression analysis model, so as to calculate an assessing grade representing a possibility of the subject having dementia;
    wherein the clinical test data comprises a computed tomographic image, a nuclear magnetic resonance image and a blood test value of the subject.

2. The method for assessing and predicting dementia of claim 1, wherein the convolution neural network learning classifier comprises a downsampling tower and an upsampling tower, and the downsampling tower and the upsampling tower are connected to each other by a skip connection.

3. The method for assessing and predicting dementia of claim 2, wherein the downsampling tower comprises a plurality of DenseNet blocks (DNBs), and an image size is progressively reduced between each of the plurality of DenseNet blocks by a convolution (Cony) method.

4. The method for assessing and predicting dementia of claim 2, wherein the upsampling tower comprises a plurality of DenseNet blocks (DNBs), and an image size is progressively enlarged between each of the plurality of DenseNet blocks by a transpose convolution (TConv) method.

5. An eye care device, comprising:
a retinal layer thickness detection system, comprising:
- an image capturing unit configured to capture a target optical coherence tomographic image of a subject; and
- a processor electrically connected to the image capturing unit and storing a program, wherein the program detects a retinal layer thickness of the subject when the program is executed by the processor, and the program comprises:
  - a reference database obtaining module configured to obtain a reference database, wherein the reference database comprises a plurality of reference optical coherence tomographic images;
  - a reference image pre-processing module configured to duplicate each of the plurality of reference optical coherence tomographic images and mark a cell segmentation line of each of retinal layers, so as to obtain a plurality of control optical coherence tomographic images;
  - a reference feature selecting module configured to analyze each of the plurality of reference optical coherence tomographic images, and obtain at least one reference image feature from each of the plurality of reference optical coherence tomographic images, so as to obtain a plurality of the reference image features;
  - a training module configured to train with the plurality of the reference image features through a convolution neural network learning classifier to reach convergence, so as to obtain a retinal layer thickness detection model;
  - a confirming module configured to output a plurality of marked optical coherence tomographic images by the retinal layer thickness detection model, and to compare each of the plurality of marked optical coherence tomographic images with corresponding one of the plurality of control optical coherence tomographic images, so as to confirm an accuracy of the retinal layer thickness detection model;
  - a target feature selecting module configured to analyze the target optical coherence tomographic images, and obtain at least one target image feature;
  - a marking module configured to analyze the target image feature by the retinal layer thickness detection model, so as to output a marked target optical coherence tomographic image; and
  - a calculating module configured to calculate a cell thickness of each of the retinal layers in the marked target optical coherence tomographic image, and to compare the cell thickness of each of the retinal layers with a clinical test data of the subject by a regression analysis model, so as to calculate an assessing grade representing a possibility of the subject having dementia; and
an electronic device connected to the retinal layer thickness detection system through telecommunication;
wherein the clinical test data comprises a computed tomographic image, a nuclear magnetic resonance image and a blood test value of the subject.

6. The eye care device of claim 5, wherein the convolution neural network learning classifier comprises a downsampling tower and an upsampling tower, and the downsampling tower and the upsampling tower are connected to each other by a skip connection.

* * * * *